June 28, 1966   M. ROSSNAN   3,257,683
CRAB MEAT COLLECTING MACHINES
Filed Sept. 23, 1965

INVENTOR
Michael Rossnen

United States Patent Office 3,257,683
Patented June 28, 1966

3,257,683
CRAB MEAT COLLECTING MACHINES
Michael Rossnan, 11724 Lovejoy St., Silver Spring, Md.
Filed Sept. 23, 1965, Ser. No. 489,621
3 Claims. (Cl. 17—2)

My present invention relates to improvements in crab meat collecting machines, one object of the invention being the provision of a machine in which suction is employed to suck the meat, raw or cooked, from the body cells or chambers of the crab, after the claws, crawling fingers and the paddles are removed to leave open stubs that lead to their respective body cells or chambers, and to collect the meat without particles of the shell, as usually done.

Another object of the invention is the provision of a complete suction machine, in which there is intermediate of the suction head and motor driven power suction means, a collector for the meat, while the suction head is manually controlled to grip the crab body air-tight upon opposite sides of the body of the crab and to cover the stubs air tight so that the cells or chambers will be entirely cleaned of the meat therein, the fitting of the suction head and its removal being foot controlled.

In order that the present invention may be fully understood, attention is invited to the accompanying drawings, in which.

Figure 1:
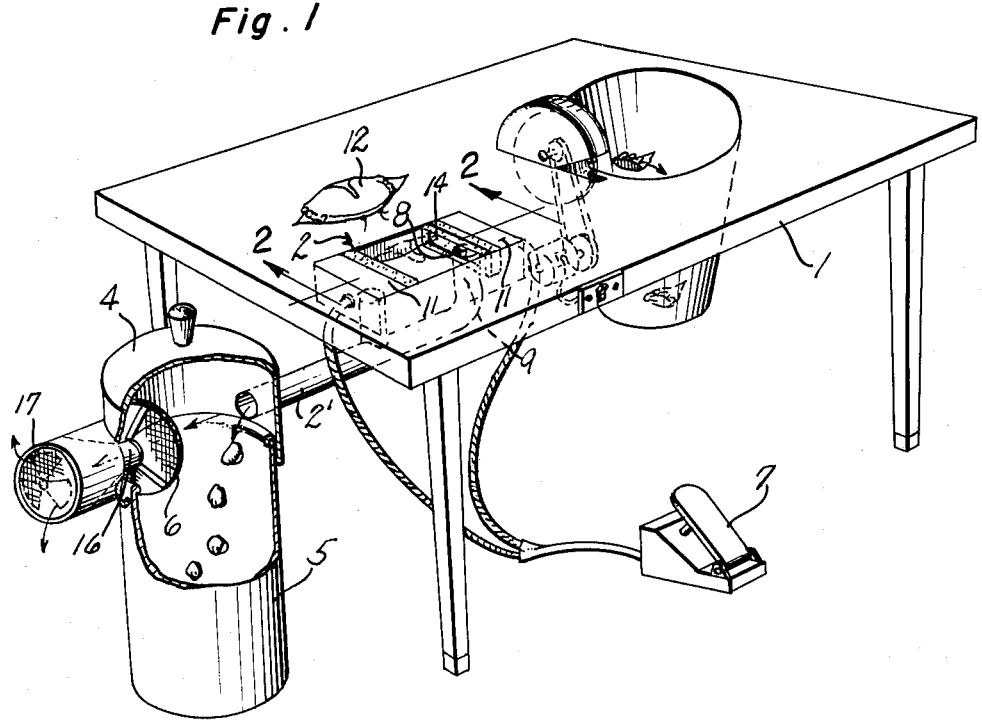
FIGURE 1 is a diagrammatical view of the complete apparatus.
Figure 2:
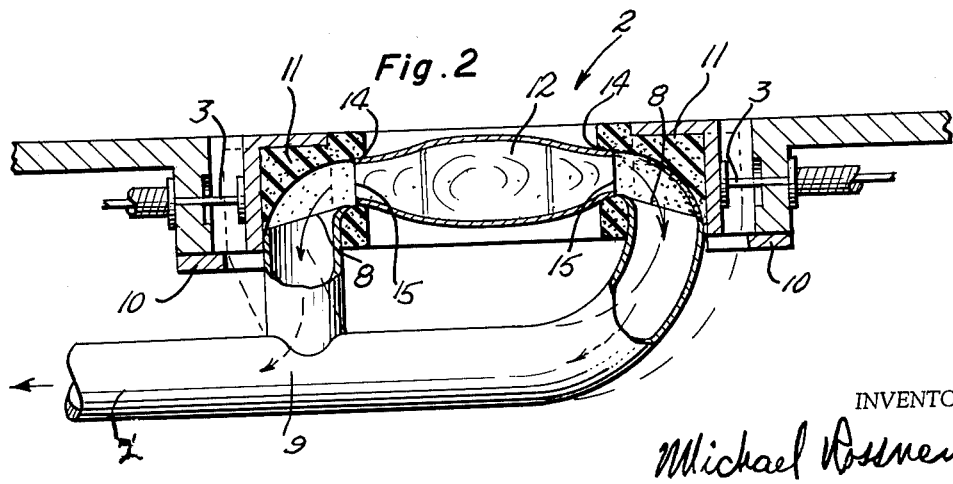
FIGURE 2 is an enlarged fragmentary, sectional view of FIGURE 1 taken on line 2—2 of FIGURE 1.

Referring to the drawings, the numeral 1 designates a stand or support, upon which is mounted a motor driven suction device 2 having twin suction heads 11, having an inlet conduit 2', in which is mounted a manually controlled flexible cable 3. The conduit is connected to a cover 4, of a removable meat receptacle 5, and the inlet of the exhaust conduit 16 within the cover is covered with a removable strainer 6.

The suction heads 11 in their inward movement into contact with the crab body are controlled by the foot pedal 7 through the flexible cable 3, which is under the control of the operator, the suction fan motor 17 being operated continually, and thus air can be drawn in at the free inlet 8, or the main conduit before the suction head is applied to the crab.

Leading from the conduit 2' is a conduit 9, supported by the frame 10, and carrying the twin suction head 11, which is so positioned, as to be fitted manually upon a crab body 12, so that the flexible mouths 14, of the suction head will fit air-tight upon the crab body and over the stubs 15. Conduit 9 is provided with twin upwardly extending conduits which are flexible to permit the suction heads 11 to move into engagement with the crab.

With the crab body in this position, the operator now presses the foot pedal, causing suction action to be applied through the respective conduits to the suction head, where the suction acts upon the meat within the cells or chambers of the crab body, carries this meat to deposit same into the removable collector or receptacle, and permitting the air power to escape through the exhaust conduit and the suction device itself.

This action may be only necessary once to empty the cells or chambers of the crab body, but if necessary the operator may actuate the pedal again until the body is free of meat, and then the suction head members are removed from the crab body, and another crab body substituted.

From the foregoing description taken in connection with the drawings, it will be seen that with this machine, the meat of the crab is removed and collected by suction action, and that such meat will be free of shell particles, and can be molded into shapes, or used as collected.

What I claim as new is:

1. A machine for removing meat from crab bodies, including in combination, a support, a motor driven suction device carried thereby, a conduit leading from the inlet of the suction device, a receptacle cover to which the conduit is connected, a removable receptacle carried by the cover, a suction fan, a second conduit connected to said suction fan and the cover opposite to the first conduit, said suction device including twin suction heads connected to said first conduit to embrace the crab body air tight, manually operated means to move said twin suction heads inwardly from positions in which they are open to the atmosphere to positions in which they engage and support the crab body whereby the meat within the cells of the crab body is sucked therefrom and deposited in the receptacle.

2. A machine for removing meat from crab bodies, including in combination a main support, a motor driven suction device, a first conduit leading from the suction device, a receptacle for the crab meat, said first conduit being connected at one side of the top thereof to produce suction in the receptacle, a suction fan, a second conduit leading from the receptacle to said suction fan, said motor driven suction device including twin suction heads connected to said first conduit, and pedal controlled means to move the heads toward each other to produce a clamping action at opposite sides of a crab body to suck the meat from the cells thereof.

3. A machine for removing meat from crab bodies, after the claws, crawling fingers and paddle have been removed to expose open-ended body cavities, including in combination, a support, a motor driven suction device carried thereby, a conduit leading from the outlet of the suction device, a receptacle cover to which the conduit is connected, a removable receptacle attached to the cover, a suction means, a second conduit connected to said suction means and the cover, said suction device including a single suction head connected to said first conduit, said suction head having the mouth thereof conforming and fitting suction-tight upon one side of the crab body to suck the meat from all of the claw, crawling fingers and paddle cavities simultaneously, abutment means for the other side of said crab body and manually operated means to move said suction head inwardly from a position in which it is open to the atmosphere to a position in which it engages and supports said one side of said crab body whereby the meat within the cells of the crab body is sucked therefrom and deposited in the receptacle.

References Cited by the Examiner
UNITED STATES PATENTS
965,706    7/1910    Greiner _____ 17—2
FOREIGN PATENTS
145,140    2/1952    Australia.

SAMUEL KOREN, Primary Examiner.
LUCIE H. LAUDENSLAGER, Examiner.